March 30, 1965 P. A. BERGSTEN 3,175,549
CHARCOAL BARBECUE BROILER FIREBOX
Filed Dec. 11, 1961 2 Sheets-Sheet 1

INVENTOR.
PETER A. BERGSTEN
BY
Mann, Brown & McWilliams
ATTORNEYS

March 30, 1965   P. A. BERGSTEN   3,175,549
CHARCOAL BARBECUE BROILER FIREBOX

Filed Dec. 11, 1961   2 Sheets-Sheet 2

INVENTOR.
PETER A. BERGSTEN
BY
*Mann, Brown, McWilliams*
ATTORNEYS

United States Patent Office 3,175,549
Patented Mar. 30, 1965

3,175,549
CHARCOAL BARBECUE BROILER FIREBOX
Peter A. Bergsten, 630 Sycamore Road, Barrington, Ill.
Filed Dec. 11, 1961, Ser. No. 158,354
1 Claim. (Cl. 126—25)

The present invention relates to structural improvements in portable charcoal barbecue broilers. It more specifically applies to a barbecue broiler having a rotisseries attachment and a drip pan wherein a portable vertical charcoal firebox is positioned in proximity to the rotisserie. However, it most specifically applies to a firebox capable of multiple positioning in relation to the rotisserie, and to a firebox having a shroud attachment for extinguishing the fire, and which also serves as a carrying case for the firebox.

In the conventional circular bowl charcoal broiler having a rotisserie attachment, the bottom of the bowl is lined with an aggregate upon which a layer of charcoal is placed. The charcoal is then ignited after which a considerable length of time must pass before the coals will be in a condition to produce a sufficient quantity of heat to broil the meats placed upon the rotisserie. During this broiling process, the drippings from the meat fall directly into the charcoals and cause flash fires thus burning the meats placed upon the rotisserie. After the broiling process is completed, the charcoal is then left to burn until it extinguishes itself thus uselessly consuming the remainder of the partially used charcoal.

It is obvious from the foregoing discussion that the conventional barbecue broiling method is inconvenient, time consuming and expensive. It is these drawbacks and others that will become apparent from the specification that this invention specifically sets out of overcome. Accordingly, it is an object of the present invention to provide a portable charcoal firebox in combination with a barbecue rotisserie device which is placed in an upright position in proximity to the rotisserie to provide a varying degree of heat to the rotisserie, and therefore, improve the efficiency of the broiling process. The vertical firebox eliminates the possibility of flash fires caused by meat drippings falling into the firebox and the scorched meat which results from such fires.

A further object is to provide a charcoal firebox adjustable within a drip pan and in combination with a barbecue rotisserie device to supply a quantity of heat dependent upon the position of the firebox in relation to the rotisserie, and to provide a means for recovering the meat drippings from the meats broiling upon the rotisserie.

A further object is to provide a portable charcoal firebox having a grate as one vertical side wall and an open top forming a draft passage to assist in the ignition of the charcoals, and also in providing the necessary combination air to quickly put the coals in a condition to produce a sufficient quantity of heat to broil the meats placed upon the rotisserie.

A still further object is to provide a portable charcoal firebox and shroud used in combination, whereby, the shroud serves to extinguish the fire and also provides a convenient carrying case for the firebox.

A still further object of this invention resides in its simplicity of arrangement and construction whereby it is inexpensive to make and is readily adaptable to mass production manufacturing techniques.

Other and additional objects will become manifest from the ensuing description taken in conjunction with the accompanying drawings.

To the accomplishment of the foregoing and related ends, the present invention then consists of the means hereinafter fully described and particularly pointed out in the claims, the annexed drawings and the following description setting forth in detail certain means in carrying out the invention, such disclosed means illustrated, however, but a few of the various ways in which the principal fall of the invention may be employed.

The present invention is illustrated by way of example in the accompanying drawings in which.

Figure 1:
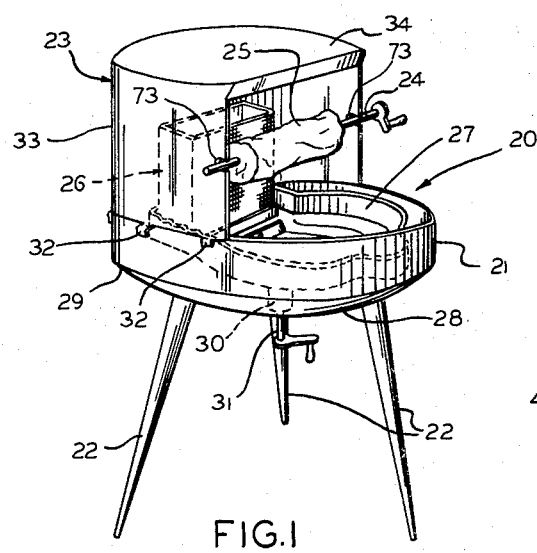
FIG. 1 is a side elevational view of the barbecue broiler, rotisserie and firebox combination.

Referring now to the drawings and more particularly to FIG. 1, a conventional portable charcoal barbecue broiler assembly of the type commonly used for outdoor cooking and generally purchased in hardware sections of department stores is shown and is referred to generally by numeral 20.

The device consists of a bowl 21 supported by a set of legs 22 which provides a triangular or tripodal supporting structure. Attached to the bowl 21 is a cowl or hood 23 having a rotatable rotisserie 24 with a cut of meat 25 positioned thereon. Within the bowl, a portable vertical firebox 26 and a drip pan 27 is positioned.

The bowl 21 consists of an upwardly concave dish 28 which integrally blends with an upstanding side rim 29. The bowl is of generally a circular configuration made of alloy steel having heat resistant properties. Centrally disposed within the bowl 21 is a central tube 30 within which shaft 31 is threadably engaged; this shaft supports the central portion of drip pan 27.

The legs 22 are detachably secured to the dish 28 by suitable means (not shown). The legs 22 are downwardly tapered and of circular cross section. The tripodal structure shown is used in order to insure stability of the barbecue assembly when the assembly is placed upon irregular surfaces.

The cowl or hood 23 is positioned upon the rim 27 and is secured thereto by fingers 32 which project downwardly along the outer surface of rim 29 to snugly abut this surface. The hood 23 includes arcuate upstanding side wall 33 and cover 34 both of the general peripheral contour to conform to the configuration of bowl 20. Within side wall 33, slots 73 are provided to support the opposite ends of the rotisserie 24.

The preceding is a general description of the conventional portable outdoor barbecue broiler. Generally, in such broilers, the bottom of the bowl is filled with sand, crushed stone or some other suitable aggregate. Upon the aggregate, a layer of charcoal is provided, whereupon the charcoal is ignited by use of ignition fuel to subsequently supply the heat necessary for broiling.

This system has some inherent disadvantages: First, the heat supply is not efficiently directed toward the meat, and as a consequence, much of the heat is lost to the surrounding atmosphere. Secondly, a considerable length of time must pass before the charcoal is burning with sufficient heat output to broil the meat placed upon the rotisserie. Thirdly, the drippings from the meat fall directly into the fire and cause flash fires which flare up and burn the meat. Fourthly, after the broiling process is completed, the coals must be left to burn until totally consumed. These disadvantages are avoided by use of firebox 26, shroud 35 and drip pan 27.

Figure 4:
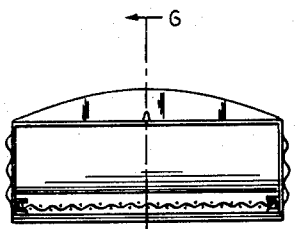
FIG. 4 is a plan view of the firebox.
Figure 2:
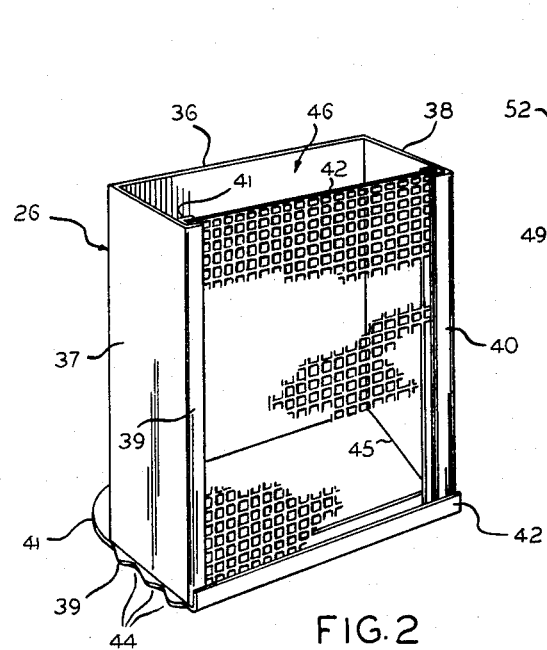
FIG. 2 is a perspective view of the charcoal firebox.
Figure 6:
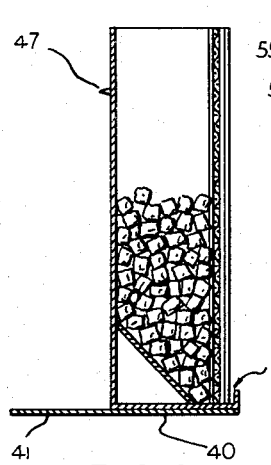
FIG. 6 is a vertical section taken substantially along the plane of section line 6—6 of FIG. 4.

Referring to FIGS. 2, 4, and 6, the firebox 26 is constructed of upstanding rear wall 36, upstanding side walls 37 and 38 and stabilizing plate 39. The rear 36 and side walls 37 an 38 are formed by selectively bending a sufficient length of sheet steel until the side walls 37 and 38 are perpendicular to the rear wall 36. The forward edges of the side walls 37 and 38 are then folded inwardly to form flanges 39 and 40. Channels 41 having a U-shape cross section are positioned rearwardly of flanges 39 and 40 and are welded thereto by suitable welding techniques. Within the channels 41, a removable and replaceable grate 42 is inserted to form the forward wall of the firebox 26. The grate is constructed of a foraminous heat resistant material, generally an expanded metal.

The stabilizing plate 39, consisting of the bottom portion 40 and semi-circular projecting tab 41, is fastened to the rear 36 and side walls 37 and 38 by suitable welding techniques. Integral with bottom portion 40 and extending forwardly and perpendicular therefrom is an upwardly projecting shoulder 42. The shoulder is positioned a sufficient distance forward of flanges 39 and 40 to provide a slot 43. The bottom portion 40 has a series of flutes 44 projecting outwardly along its side edges; its function will be described presently. Anchored within the firebox is a false bottom 45 which is positioned at approximately a 45 degree angle with respect to the bottom portion 40.

The top of the firebox 26 is open in order to provide a draft passageway 46, and therefore, an air circulation means. The passageway 46 and false bottom 45 coact to provide a means for directing and inducing air circulation through the charcoal during the ignition period and also during the broiling process, thereby increasing the combustion and exhaust efficiency of the firebox 26. In addition, the false bottom serves to support the charcoal as shown in FIG. 6, and to direct partially consumed charcoal toward and through grate 42, and to efficiently direct and radiate heat toward the rotisserie. The air circulation qualities of the firebox provide a charcoal broiler in which a small amount of ignition fuel is used to quickly produce a fire having sufficient heat output to broil meats placed upon the rotisserie.

A catch 47 is positioned upon upstanding rear wall 36 a short distance from its upper edge. The catch 47 is a conical protuberance of substantially circular cross section.

Figure 5:
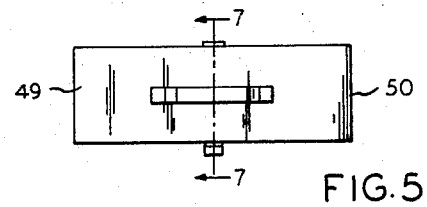
FIG. 5 is a plan view of the shroud.
Figure 3:
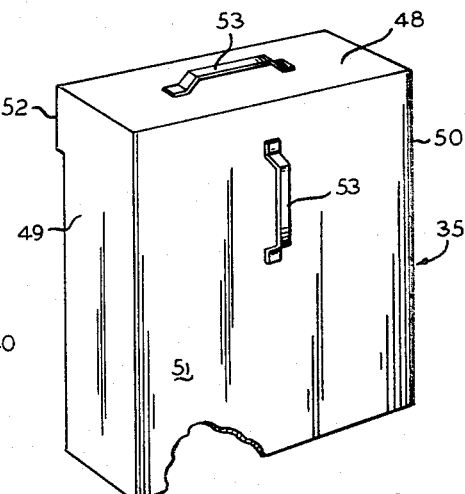
FIG. 3 is a perspective view of the shroud broken away to facilitate disclosure.
Figure 7:
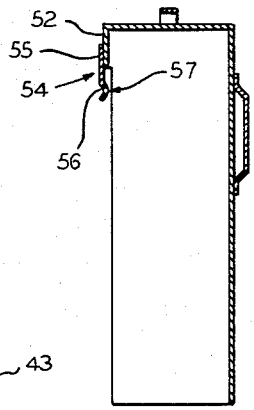
FIG. 7 is a vertical section taken substantially along the plane of section line 7—7 of FIG. 5.
Figure 8:
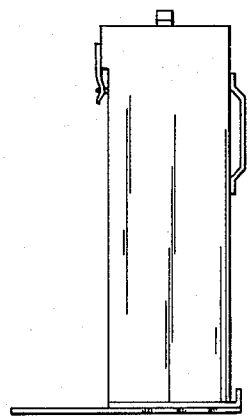
FIG. 8 is a side elevational view of the shroud and firebox in combination.

Referring to FIGS. 3, 5, and 7, the shroud 35 is comprised of a top portion 48, front wall 51, overhang 52 forming a partial back wall, and side walls 49 and 50. Any series of the thus named elements may be formed from a single sheet of steel by suitable forming techniques and rigidly connected to the other elements by suitable fastening means to form the shroud 35. The sheet metal handles 53 are fastened to the front wall 51 and top portion 48 by any suitable means. Two handles are provided in order to insure sufficient gripping facilities when carrying a loaded firebox.

A latch 54, consisting of a flat shank 55 and a hook 56 with a centrally disposal aperture 57, is positioned upon overhang 52. The cooperation between firebox 26 and shroud 35 will be discussed presently.

Figure 9:
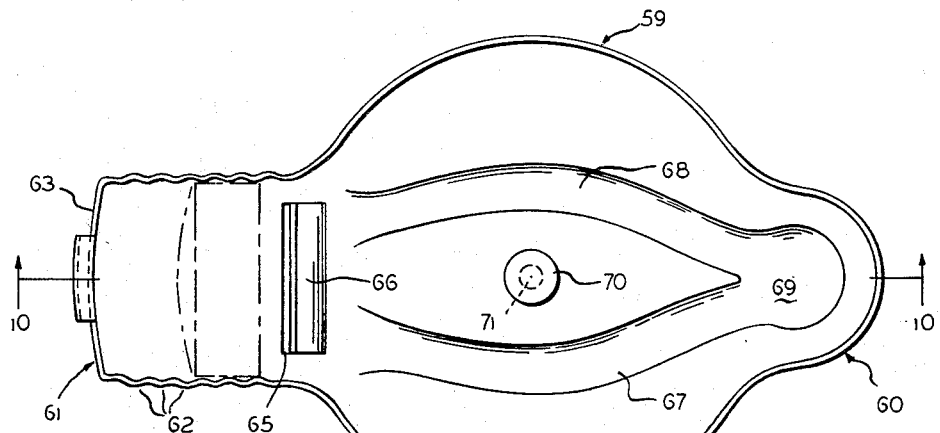
FIG. 9 is a plan view of the drip pan.
Figure 10:
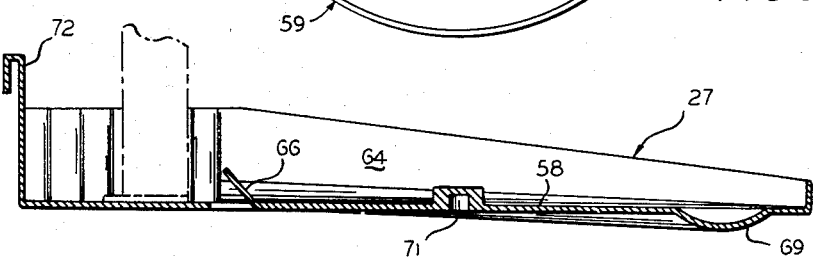
FIG. 10 is a vertical section taken substantially along the plane of section line 10—10 of FIG. 9.

Referring now to FIGS. 9 and 10, the drip pan 27 consists of an upwardly concave base plate 58 and a vertical side rim 64 blending with and rigidly connected to a base plate 58. The configuration includes arcuate portions 59 blending to one side thereof with a constrained bulb portion 60 and to the other side thereof with a neck 61. The neck has elongated undulated portions 62 of the same general contour as flutes 44 located on the firebox 26. The outer side edge 63 of the neck 61 has an arcuate contour similar to that of bowl 21.

Within base plate 58, a rectangular opening 65 is positioned in proximity to the undulated portions 62, and this opening is shielded by flap 66. The function of flap 66 will be discussed later. The base plate 58 has downwardly depressed troughs 67 and 68 which are concave in cross section. The troughs 67 and 68 extend from proximity of the flap 66 where they are disjoined, to gradually taper downwardly to join at the cup 69. The troughs 67 and 68 serve a dual purpose, first as a means to carry the meat drippings to the cup 69 where they may then be ladled and used to baste the meat, secondly as a strengthening rib such that heat and the weight of the charcoal in the firebox will not deform the pan. Centrally disposed within the pan is a circular boss 70 having a blind hole 71 which coacts with shaft 31 to support the central portion of the drip pan 27. The drip pan is also supported at its outer edge by an inverted U-shaped clip 72.

The foregoing discussion points out the structural refinements of the firebox 26, shroud 35 and drip pan 27. The following paragraphs will now show the interrelationship of these elements.

The firebox 26 coacts with drip pan 27 to provide an adjustable vertical firebox. The firebox 26 is positioned within the drip pan 27 in such a manner that the flutes of the firebox 44 engage and cooperate with the undulated portions 62 of the drip pan to position the firebox with respect to the rotisserie. The position of the firebox 26 may be varied as the broiling requirements of the meat 25 so dictate by altering the engagement of flutes 44 with respect to the undulated portions 62. It is also possible to use the firebox 26 without the coacting drip pan 27. In this situation, the firebox 26 is supported by a suitable aggregate placed in the bowl to a sufficient level to direct an adequate supply of heat toward the rotisserie 24.

During the broiling process meat drippings fall into the drip pan 27, and due to the concave shape of the pan they drain into troughs 67 and 68 and then subsequently flow downwardly toward cup 69. These drippings may then be ladled from cup 69 and used to baste the meat. To prevent the meat drippings from becoming contaminated with ashes that fall through the grate 42, a rectangular opening 65 is provided so that the ashes will fall directly into bowl 21. The flap 66 shields the opening 65 so that the meat drippings falling near the firebox will be directed into the troughs 67 and 68.

As stated previously, the shroud 35 serves a dual purpose, first to extinguish the fire, secondly as a carrying case for the firebox. The shroud 35 is secured to the firebox 26 by positioning the shroud 35 directly above the firebox 26 a sufficient distance so that overhang 52 clears the firebox. The shroud 35 is vertically lowered until the hook 56 engages with catch 47 to outwardly displace hook 56, whereupon the catch 47 snaps into engagement with aperture 57 to lock the assembly in a carrying position. During this process, the front wall 51 is aligned so as to be in engagement with slot 43 when the shroud is in the locked position. The handles 53 are conveniently located for carrying purposes and also for assisting in positioning the shroud upon the firebox. The shroud 35 may also be used as a hopper when filling the firebox with charcoal.

While the preferred embodiment of the portable firebox, drip pan and shroud have been shown and described it will be apparent that numerous modifications and variations thereof may be made without departing from the underlying principles of the invention. It is, therefore, desired by the following claim to include within the scope of the invention all such variations and modifications by which substantially the results of this invention may be obtained through the use of substantially the same or equivalent means.

What I claim as new and desire to secure by Letters Patent is:

In a hand portable charcoal barbecue cooking apparatus, a rectangularly shaped metal firebox comprising imperforate metal bottom, end and rear walls and having a open metal grill connected as a front wall between said end walls to define a combustion space that is relatively shallow from front to rear and into the open top of which charcoal briquettes or the like may be introduced for burning while being exposed through said grill for forward radiation of heat, and a carrying case for said apparatus including a shroud adapted to be positioned over said firebox in tight fitting relation for enclosing and extinguishing a fire in said firebox, said shroud comprising imperforate walls for spanning the open top and front of the firebox and for engaging the walls of the firebox to substantially exclude air from the firebox so as to thereby extinguish fire in the firebox, a carrying handle on the shroud, and interengageable latch means on the shroud and firebox for securing the shroud to the firebox.

References Cited by the Examiner
UNITED STATES PATENTS

| | | | |
|---|---|---|---|
| 755,786 | 3/04 | Martin | 220—20 |
| 924,849 | 6/09 | Smith | 220—20 |
| 1,355,249 | 10/20 | Nottingham | 126—25 |
| 1,656,181 | 1/28 | Elbert | 126—14 |
| 2,306,467 | 12/42 | Reynolds | 126—25 |
| 2,718,845 | 9/55 | Dudley | 99—421 |
| 2,781,037 | 2/57 | Vuncannon | 126—25 |
| 2,885,950 | 5/59 | Stoll et al. | 99—446 X |
| 3,018,772 | 1/62 | Blazey | 126—25 |
| 3,079,909 | 3/63 | Bemben | 126—25 |

ROBERT E. PULFREY, *Primary Examiner.*

LAWRENCE CHARLES, JEROME SCHNALL,
*Examiners.*